United States Patent [19]

Proctor

[11] Patent Number: 4,629,866
[45] Date of Patent: Dec. 16, 1986

[54] METHOD AND DEVICE FOR TRANSFERRING HEAT THROUGH A DOUBLE WALLED CONTAINER

[75] Inventor: Rudy Proctor, Costa Mesa, Calif.

[73] Assignee: R & P Company, Los Angeles, Calif.

[21] Appl. No.: 659,458

[22] Filed: Oct. 10, 1984

[51] Int. Cl.⁴ .............................................. A47G 23/04
[52] U.S. Cl. .................... 219/439; 219/432; 219/430; 219/521; 219/530; 126/390
[58] Field of Search ............... 219/429, 430, 431, 432, 219/433, 438, 439, 521, 530; 126/375, 376, 377, 378, 390, 400; 165/105, 104; 220/405, 426, 68, 427, 428; 99/438

[56] References Cited

U.S. PATENT DOCUMENTS

| | | | |
|---|---|---|---|
| 175,710 | 4/1876 | Jones | 126/390 |
| 551,933 | 12/1895 | Manning | 220/68 |
| 841,681 | 1/1907 | French | 99/418 |
| 1,151,189 | 8/1915 | Kercher | 219/439 X |
| 1,487,817 | 3/1924 | Sloan | 222/131 |
| 1,493,459 | 5/1924 | Jancikin | 219/439 X |
| 1,717,450 | 6/1929 | Hostettler | 126/390 |
| 1,866,777 | 7/1932 | Sasser | 126/375 |
| 2,151,535 | 3/1939 | Scurlock | 126/390 |
| 2,174,425 | 9/1939 | Schlumbohm | 220/408 X |
| 2,236,837 | 4/1941 | Rimmel | 219/439 X |
| 2,279,000 | 4/1942 | Larson | 219/439 |
| 2,605,928 | 8/1952 | Heller | 220/68 |
| 2,640,478 | 6/1953 | Flournoy | 126/375 |
| 2,969,452 | 1/1961 | Geller et al. | 219/439 |
| 3,054,395 | 9/1962 | Torino | 126/375 |
| 3,145,708 | 8/1964 | Fischer | 126/390 |
| 3,164,148 | 1/1965 | Tolciss | 126/375 |
| 3,432,642 | 3/1969 | Lohr et al. | 219/439 |
| 3,491,227 | 1/1970 | Stephens | 219/439 |
| 3,815,575 | 6/1974 | Danis | 126/390 |
| 4,086,907 | 5/1978 | Rothschild | 126/375 X |
| 4,258,695 | 3/1981 | McCarton et al. | 126/375 |

FOREIGN PATENT DOCUMENTS

| | | | |
|---|---|---|---|
| 512743 | 11/1930 | Fed. Rep. of Germany | 219/439 |
| 1195883 | 7/1965 | Fed. Rep. of Germany | 219/439 |
| 592734 | 5/1925 | France | 219/439 |
| 566432 | 9/1957 | Italy | 219/439 |
| 169295 | 5/1934 | Switzerland | 219/439 |

Primary Examiner—E. A. Goldberg
Assistant Examiner—Teresa J. Walberg
Attorney, Agent, or Firm—Fleit, Jacobson, Cohn & Price

[57] ABSTRACT

A device for transferring heat from a heating source to contents of an article to be warmed in which the device includes an outer wall adapted to be heated by a heating source, the heat source having a temperature above 212° F., an inner wall secured to the outer wall, a sealed cavity defined between the inner wall and the outer wall, and a heat-transfer liquid located in the sealed cavity for transferring heat from the heating source at a temperature above 212° F. through the inner wall to the contents of the article to heat the contents of the article to a temperature below 212° F.

19 Claims, 3 Drawing Figures

METHOD AND DEVICE FOR TRANSFERRING HEAT THROUGH A DOUBLE WALLED CONTAINER

BACKGROUND OF THE INVENTION

In a typical coffee maker, coffee grounds are placed in a conical filter which is held in a cup located directly below a heated water dispenser. Tap water is poured over a heating coil located in a heating chamber of the hot water dispenser which elevates the temperature of the water to approximately 180° F., after which the heated water exits the heating chamber of the coffee maker and mixes with coffee grounds located below the heating chamber. The heated water mixes with the coffee grounds and passes through the conical filter to a coffee pot positioned below the coffee grounds holding cup. The hot coffee is collected within the coffee pot located on a heating plate. The heating plate includes an electrical coil generating heat to keep the coffee in the coffee pot hot.

The object of the heating plate is to keep the coffee at a temperature satisfactory for most coffee drinkers. The heating plate underneath the coffee pot generates a temperature of approximately 250° to 350° F. The heat given off from the heating plate is transferred through the bottom of the coffee pot to the coffee.

The constant exposure of the coffee, in the coffee pot, to the heat generated by the heating plate produces many disadvantageous results. The heating plate generates a temperature in excess of the boiling point of coffee, and will boil away the coffee in the coffee pot over a period of time. Further, exposure to the 250° to 350° F. heat generated by the heating plate causes coffee crystals at the bottom of the coffee pot to burn over a relatively short period of time. The burned coffee crystals circulate throughout the pot of coffee and affect the taste of the coffee being heated in the coffee pot. Further, the deteriorated crystals can collect at the bottom of the coffee pot to form an unsightly residue. A coffee pot will also crack due to continuous exposure to heating and cooling of the coffee pot if the pot is left on the heating plate after the contents of the pot have been boiled away by the heat generated by the heating plate.

This problem is also pervasive in the food industry where solid and liquid food are required to be maintained within a certain temperature range below 212° F., either for storage or for serving. Exposure to temperatures above 212° F. will dry out or cause the boiling away of the contents of a pot, pan or container holding the food and cause spoilage of the food.

To overcome extended exposure to elevated temperature conditions for liquids, attempts have been made to lower the temperature of the heat source. Lower temperature heat sources have been found to maintain brewed coffee or other food items at a temperature which is unsatisfactory.

It is an object of the present invention to overcome the disadvantages of present food warming systems for food holding containers.

It is an object of the present invention to provide a method for transferring heat through a double walled container.

It is another object of the present invention to maintain the temperature of the contents of a liquid container at approximately 180° F.

It is yet another object of the present invention to transfer a quantity of heat generated by an electric heating plate at a temperature of approximately 250° to 350° F. to a container to maintain the temperature of the contents of the container at approximately 180° F.

It is still another object of the present invention to provide a double walled enclosure surrounding a bottom portion of a container.

It is still yet another object of the present invention to provide a heat-transfer liquid which does not boil or vaporize substantially at temperatures up to 600° F. within a sealed cavity of a double walled enclosure surrounding the bottom portion of a container It is still yet another further object of the present invention to provide a heat-transfer liquid which transfers heat from a heating source, at a temperature of approximately 250° to 350° F., to a liquid in a container to maintain the liquid at a temperature of approximately 180° F.

BRIEF SUMMARY OF THE INVENTION

The present invention includes a method and apparatus for transferring heat from a heating source to an article to be warmed through a double walled container. The container includes an outer wall adapted to be heated by a heating source and an inner wall secured to the outer wall A sealed cavity is formed between the inner and outer walls. A heat transfer liquid is located in the sealed cavity. Heat is transferred from a heating source at a temperature above 212° F. through the outer wall to the heat-transfer liquid and the heat-transfer liquid transfers heat through the inner wall to heat the contents of the container to a temperature below 212° F. The heat-transfer liquid substantially fills the sealed cavity and preferably is an oil.

Figure 1:
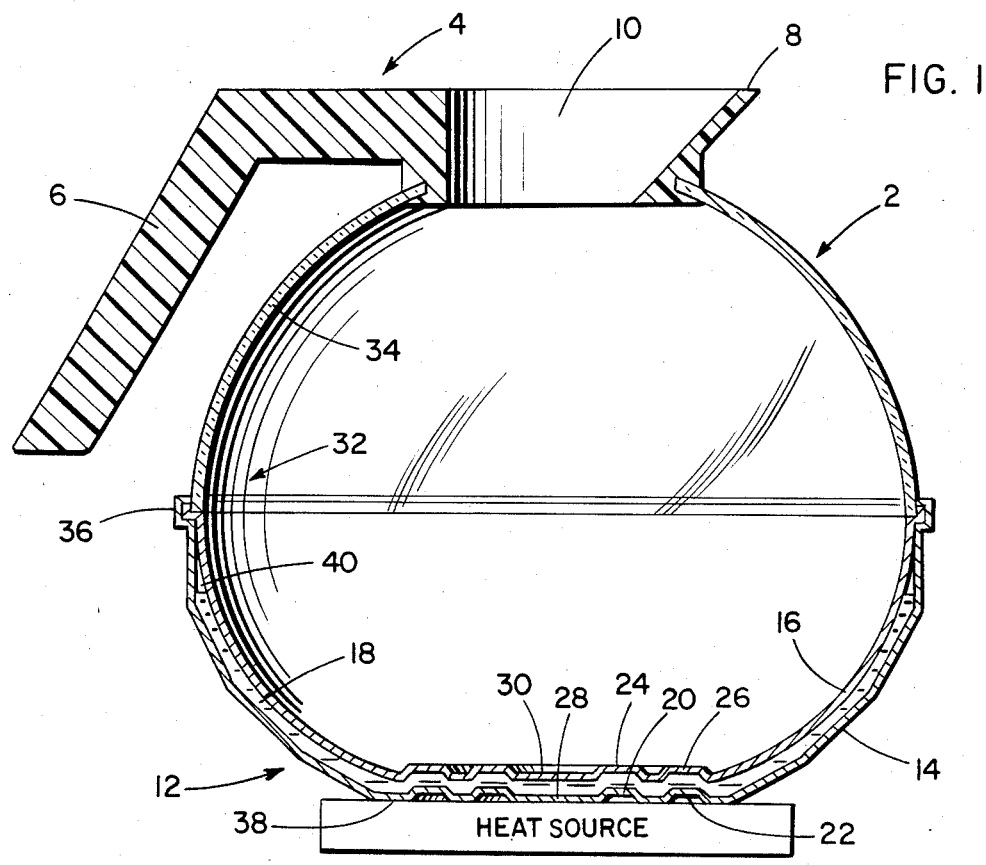
FIG. 1 is a cross-sectional side view of a coffee pot having a double walled bottom portion.

DETAILED DESCRIPTION OF THE DRAWINGS:

In FIG. 1, a coffee pot 2 is shown having a pouring member 4, including a handle 6 and pouring lip 8. An opening 10, defined by pouring member 4, allows freshly brewed coffee to be introduced into the coffee pot 2 and allows for removal of coffee from the coffee pot 2 when poured from pouring lip 8.

At a bottom portion of the coffee pot 2 is a double walled container 12. An outside wall 14 of the container 12 is separated from an inside wall 16 of the double walled container 12 typically by ¼ to ⅜ inch. A heat-transfer liquid 18 is sealed between the walls 14 and 16 of the double walled container 12 and substantially fills the space defined between the inner wall 16 and outer wall 14. A pair of concentric indented rings 20 and 22 are formed in the outer wall 14. Corresponding concentric rings 24 and 26 are formed by the inner wall 16. A flat portion 28 is at the center bottom portion of the outer wall 14 formed within the ring 20. An opposing flat central section 30, to that of flat central section 28, is formed by inner wall 16.

The double walled container 12, forming approximately 50% of the container, is sealed at 32 to the top plastic, such as polycarbonate, or glass portion 34 of the coffee pot 2. The double walled container 12 has a lip 36 which is molded around the top plastic or glass portion 34 of the coffee pot 2 at point 32 extending about the circumference of top plastic or glass portion 34. The lip 36 seals the double walled container to the top plastic or glass portion 34 of the coffee pot 2 to prevent any leakage of coffee from the coffee pot. The inner wall 16 of the double walled container 12 is curved from the point 32 to outer ring 26. The outer wall 14 forms a series of stepped flat portions from the lip 36 to the flat ring portion 38 which is concentric with the flat central portion 28. A space 40 is located within the double walled container 12 where the heat-transfer liquid 18 does not completely fill the space defined between the walls 14 and 16.

Figure 2:
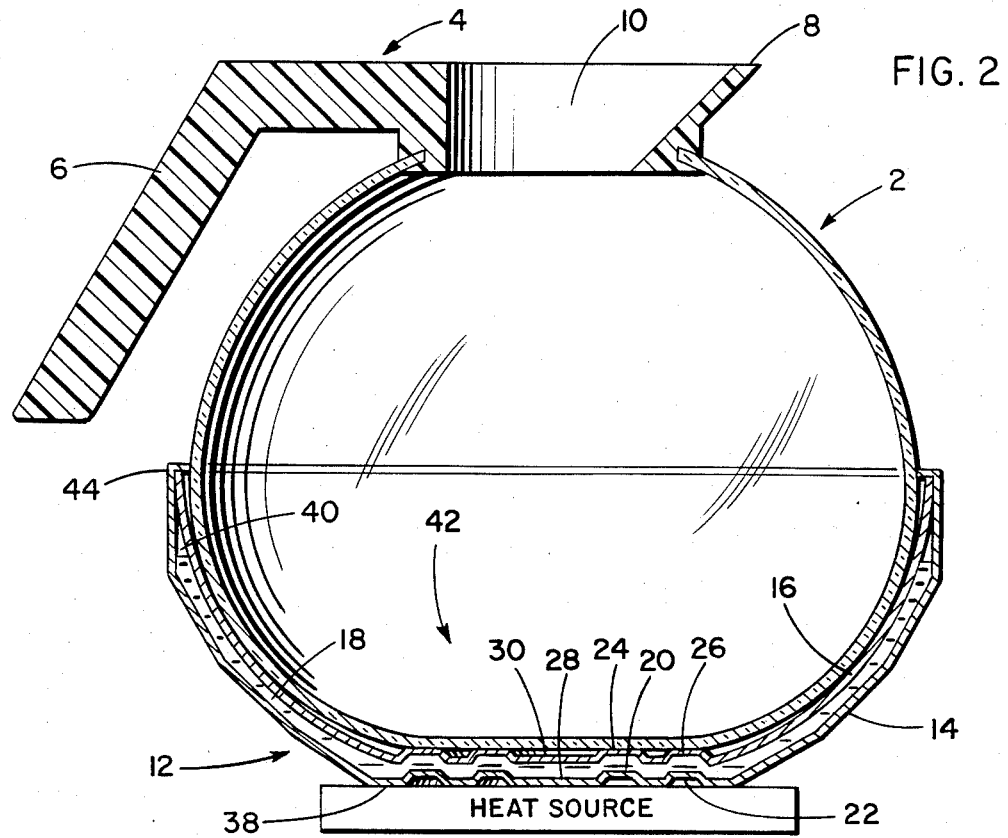
FIG. 2 is a cross-sectional side view of a coffee pot having a double walled container surrounding a bottom portion of the coffee pot.

In FIG. 2, similar elements to those of FIG. 1 use the same reference numerals. In FIG. 2, the coffee pot 2 is all of plastic or glass. The double walled container 12 surrounds a bottom portion 42 of the coffee pot 2. The edge portion 44 of the double walled container 12 grips the bottom portion 42 of the coffee pot and holds the double walled container 12 around the bottom portion 42 of the coffee pot. The double walled container, as shown in FIG. 2 is removable and transferable to other coffee pots.

Figure 3:
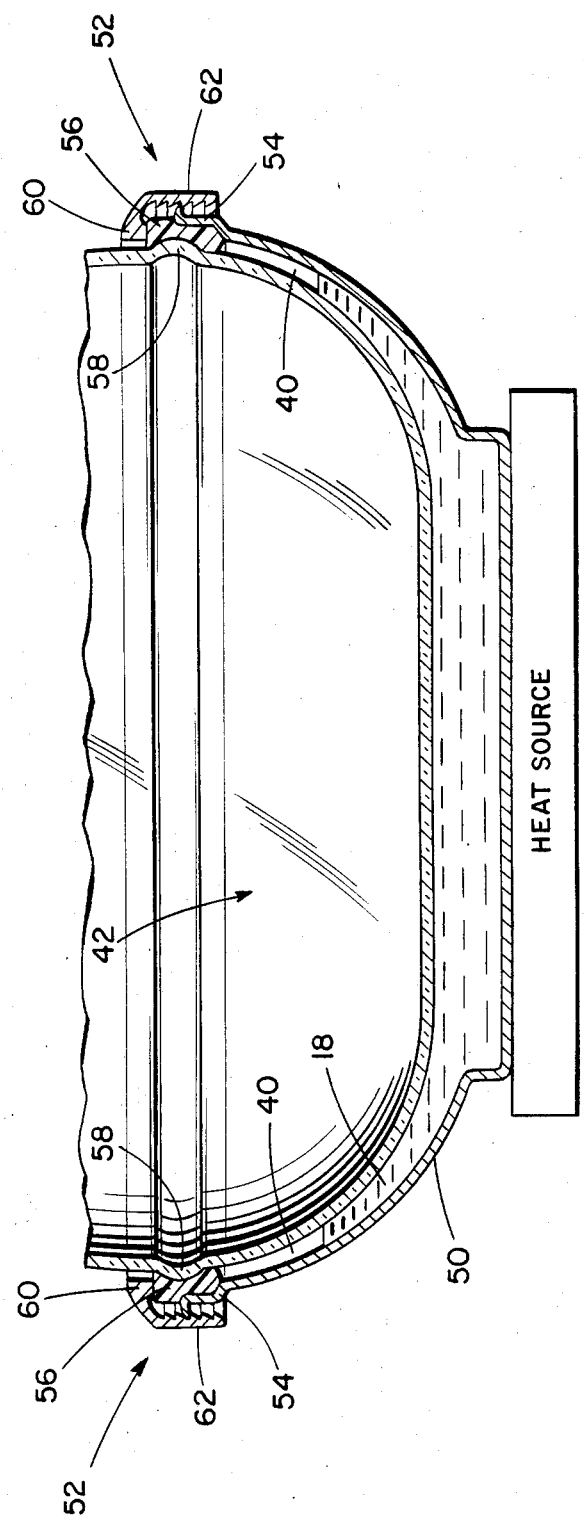
FIG. 3 is a partial cross-sectional side view of a coffee pot having a single wall sealingly surrounding a bottom portion of the coffee pot.

In Figure 3, similar elements to those of FIG. 2 use the same reference numerals. In this embodiment, the polycarbonate plastic or glass bottom portion 42 of the coffee pot is surrounded by a single wall 50 made of stainless steel. The single wall 50 is sealed to the bottom of the coffee pot by a seal generally shown at 52. The edges of the single wall 50 are flanged outwardly at 54 and an annular gasket 56 is interposed between the flanged portion 54 and a raised annular ring 58 of the plastic, such as polycarbonate, or glass bottom portion 42 of the coffee pot. A plastic snap ring 60 sealingly engages the flange 54 and gasket 56 around the raised annular ring 58. A series of steps 62 of the snap ring 60 allow for sealing engagement with various sized gaskets. A heat-transfer liquid 18 is sealed between the single wall 50 and bottom portion 42 of the coffee pot. A space 40 is located within the enclosed area sealed by the single wall 50 and bottom portion 42. The stainless steel single wall 50 is in the range of 0.020 inches thick.

The double-walled container shown in FIG. 1 and 2 and the single wall shown in FIG. 3 is preferably made of a material which has good heat transfer properties. The basic equation for heat conduction, Fourier's law, relates the steady-state heat conduction per unit area to the temperature difference across a unit thickness (i.e., temperature gradient). The constant of proportionality is the thermal conductivity of the material selected. Good heat-transfer agents have high thermal conductivities and good insulators have very low thermal conductivities. The double-walled enclosure of the present invention preferably has a relatively high thermal conductivity. The double-walled enclosure may be made of a metal, such as stainless steel or brass, or of glass or of some other material having similar heat conducting properties.

The quantity of heat transferred by the double-walled container is a direct function of the surface area, particularly the surface area in direct contact with the contents of the coffee pot. While this surface area is not critical, it should be adequate to maintain the contents of the coffee pot or other container at a desired temperature. As illustrated in FIGS. 1 and 2, the double-walled container typically encloses or surrounds approximately 50% of the coffee pot. However, the degree to which the double-walled container surrounds the food container will depend on various factors including the desired temperature of the contents of the container.

The heat-transfer liquid of the present invention may be any of various heat-transfer liquids known in the art. Generally speaking, a heat-transfer liquid is selected which has a relatively high heat capacity. The heat capacity of a body is the amount of heat which must be added to it, or subtracted from it, so as to produce a change of 1° C. in its temperature. A heat-transfer liquid also is preferably selected which has a relatively low thermal conductivity. The thermal conductivity is usually expressed as the heat that is transferred through one square foot of a one foot thick wall in one hour for a temperature difference of 1° F. between the two wall faces. Also, it is desirable to select a heat-transfer liquid which will not boil or vaporize substantially at the working temperature of the heat-transfer liquid.

The choice of an ultimate heat-transfer liquid for a particular application will depend on the temperature conditions to which the heat-transfer liquid will be subjected. With respect to a coffee pot, the heating source will typically have a temperature of approximately 250° to 350° F. The coffee will desirably be maintained at a temperature of approximately 180° F., or, more generally, in the range of 175° to 185° F. For this application, the heat-transfer liquid may be an oil such as a vegetable oil. Corn oil and soybean oil have been found to be suitable for use in this application. Other vegetable oils could also be used including cottonseed, linseed, tung, peanut, perilla and oiticica. A vegetable oil is particularly desirable because it will not boil or vaporize substantially below about 600° F.

In a preferred embodiment, the present invention operates as follows. A coffee pot having a double walled container surrounding a bottom portion of the pot is positioned on a heating source having a temperature of approximately 250° to 350° F. Heat is transferred through the outer wall of the double walled container at the portions of the double walled container contacting the heating plate. Heat is then transferred through the outer wall of the container to the heat-transfer liquid, located in the sealed space defined by the double walled container. The liquid is a high temperature oil, such as a vegetable oil, which does not boil or vaporize substantially at temperatures up to 600° F. The heat-transfer liquid transfers heat through the inner wall to the contents of the coffee pot in FIG. 1 and through the plastic or glass bottom portion of the coffee pot in FIGS. 2 and 3 to the contents of the coffee pot. The inner wall 16, shown in FIGS. 1 and 2, is preferably made of stainless steel. The outer wall 18, shown in FIGS. 1 and 2, is preferably made of stainless steel or brass.

In the forming of the double walled device, it is advantageous to first heat the heat-transfer liquid before sealing the liquid between two walls. This will create a vacuum as the liquid cools within the sealed device.

The present invention may be used with a liquid or solid held in any type or size container and is useable in the food serving field in general. The present invention can be used with cafeteria serving pans and coffee storage pots which store coffee made in large urns.

As an example, steam heating pans presently used in cafeterias require constant refilling of water in a pan located above a heating source. Another pan on top of the water filled pan is heated by the steam released by the heated water. With the present invention, the water pan can be eliminated and heat can be directly applied to a double walled enclosure interposed between the heating source and the food containing pan.

The heat transfer liquid of the present invention transfers heat from a heating source which is located below the double walled container, to the surface of the inner wall of the double walled enclosure contacting the contents of the container. Even after the container being heated is empty, any residue left on the bottom of the serving container is not burned because of the transfer of heat at a temperature below 212° F. to the serving container. The temperature in the serving container, therefore, is less than the boiling point of water and thus avoids any damage to the serving container or its contents.

From the foregoing detailed description, it will be evident that there are a number of changes, adaptations and modifications of the present invention which come within the province of those skilled in the art. However, it is intended that all such variations, not departing from the spirit of the invention, be considered as within the scope thereof as limited solely by the appended claims.

I claim:

1. A device for transferring heat from a heating source to the contents of an article, said device comprising:
   heat transfer means including
      an outer wall adapted to be heated by a heat source located externally of said heat transfer means, said heat source having a temperature above 212° F. and an exterior surface of said outer wall being substantially exposed to the atmosphere;
      an inner wall secured to said outer wall;
      sealed cavity defined between said inner wall and said outer wall;
      a heat transfer liquid located in said sealed cavity for absorbing heat from said heat source through said outer wall and for transferring heat at a temperature above 212° F. through said inner wall to the contents of said article to heat the contents of said article to a temperature below 212° F., said heat transfer liquid filling substantially all of the sealed cavity;
      a remaining portion of said cavity, other than a portion filed with said heat transfer liquid, includes a vacuum; and
      an upper edge of said heat transfer means defines a sealing means for sealing said heat transfer means to said article.

2. A device as claimed in claim 1, wherein the boiling point of the heat transfer liquid is above 600° F.

3. A device as claimed in claim 2, wherein the heat transfer liquid is vegetable oil.

4. A device as claimed in claim 1, wherein said heating source generates a temperature in the range of 250°–350° F.

5. A device as claimed in claim 1, wherein the contents of the article is heated to a temperature in the range of 175°–185° F.

6. A device as claimed in claim 1, wherein the inner wall is made of stainles steel.

7. A device as claimed in claim 1, wherein the outer wall is made of stainless steel.

8. A device as claimed in claim 1, wherein the outer wall is made of brass.

9. A device for transferring heat from a heating source to the contents of a vessel, said device comprising:
   an outer wall adapted to be heated by a heat source located externally of said outer wall, said heat source having a temperature above 212° F.;
   an inner wall secured to said outer wall;
   a sealed cavity defined between said inner wall and said outer wall;
   a heat transfer liquid located in said sealed cavity for absorbing heat from said heat source through said outer wall and for transferring heat through said inner wall at a temperature above 212° F. to the contents of said vessel to heat the contents of said vessel to a temperature below 212° F.; and
   mounting means for removably mounting said device on an exterior surface of said vessel.

10. A device as claimed in claim 9, wherein the boiling point of the heat transfer liquid is above 600° F.

11. A device as claimed in claim 10, wherein the heat transfer liquid is vegetable oil.

12. A device as claimed in claim 9, wherein said heat transfer liquid fills substantially all of the sealed cavity and a remainder of said sealed cavity includes a vacuum.

13. A device as claimed in claim 9, wherein the contents of the article is heated to a temperature in the range of 175°–185° F.

14. A device as claimed in claim 9, wherein said mounting means is defined by an upper edge of said outer wall and an upper edge of said inner wall which are biased to grip the exterior surface of said vessel.

15. A device for transferring heat from a heating source to the contents of a vessel, said device comprising:
   an outer wall adapted to be heated by a heat source located externally of said outer wall, said heat source having a temperature above 212° F.;
   an annular ring defined by an exterior surface of said vessel;
   gasket means interposed between said annular ring and said outer wall;
   sealing means for sealing together said annular ring, said gasket means and said outer wall;
   a sealed cavity defined between said exterior surface of said vessel, said gasket means and an interior surface of said outer wall; and
   a heat transfer liquid located in said sealed cavity for absorbing heat from said heat source through said outer wall and for transferring heat through said exterior surface of said vessel at a temperature above 212° F. to the contents of said vessel to heat the contents of said vessel to a temperature below 212° F.

16. A device as claimed in claim 15, wherein the boiling point of the heat transfer liquid is above 600° F.

17. A device as claimed in claim 15, wherein said heat transfer liquid fills subsstantially all of the sealed cavity, and a remainder of said sealed cavity includes a vacuum.

18. A device as claimed in claim 16, wherein the heat transfer liquid is vegetable oil.

19. A device as claimed in claim 15, wherein the contents of the vessel is heated to a temperature in the range of 175°–185° F.

* * * * *